(12) United States Patent  
Matsushita

(10) Patent No.: US 8,038,841 B2
(45) Date of Patent: Oct. 18, 2011

(54) METHOD FOR PRODUCING FINE PAPER POWDER AND RESIN COMPOSITION CONTAINING THE SAME

(75) Inventor: Takamichi Matsushita, Tokyo (JP)

(73) Assignee: Kankyokeieisogokenkyusho Co., Inc., Tokyo (JP)

( * ) Notice: Subject to any disclaimer, the term of this patent is extended or adjusted under 35 U.S.C. 154(b) by 0 days.

(21) Appl. No.: 12/811,700

(22) PCT Filed: Nov. 2, 2009

(86) PCT No.: PCT/JP2009/005821
§ 371 (c)(1),
(2), (4) Date: Jul. 5, 2010

(87) PCT Pub. No.: WO2010/106592
PCT Pub. Date: Sep. 23, 2010

(65) Prior Publication Data
US 2011/0100571 A1    May 5, 2011

(51) Int. Cl.
*D21B 1/08* (2006.01)
*B29B 13/10* (2006.01)
(52) U.S. Cl. .................. 162/28; 162/261
(58) Field of Classification Search ............ 162/28, 162/261
See application file for complete search history.

(56) References Cited

U.S. PATENT DOCUMENTS

| 1,880,045 A | * | 9/1932 | Richter | 162/149 |
| 2,054,301 A | * | 9/1936 | Richter | 162/187 |
| 2,374,046 A | * | 4/1945 | Stacom | 241/2 |
| 4,228,964 A |   | 10/1980 | Brady |  |
| 6,884,883 B1 | * | 4/2005 | Shima et al. | 536/56 |
| 7,128,858 B2 | * | 10/2006 | Ozaki et al. | 264/115 |

FOREIGN PATENT DOCUMENTS

| JP | 63-319066 | 12/1988 |
| JP | 09-215937 | 8/1997 |
| JP | 10-138241 | 5/1998 |

(Continued)

OTHER PUBLICATIONS

Machine translation of JP 2004-042032 A, Advanced Industrial Property Network, Japan Patent Office, [online], [retrieved on Jun. 24, 2011]. Retrieved from the Internet: <URL: http://dossier1.ipdl.inpit.go.jp/AIPN/odse_top_dn.ipdl?N0000=7400 >.*

*Primary Examiner* — Matthew Daniels
*Assistant Examiner* — Dennis Cordray
(74) *Attorney, Agent, or Firm* — Paul A. Guss

(57) ABSTRACT

Coarsely shredded paper powder is pulverized using a first vertical roller mill equipped with a plurality of first pulverizing rollers 15 to obtain a fine paper powder having an average particle diameter of 50 μm or greater and less than 150 μm. Then, such a fine paper powder is further pulverized using a second vertical roller mill equipped with a plurality of second pulverizing rollers 25 to obtain a fine paper powder having an average particle diameter of 25 μm or greater and less than 50 μm. Concerning the inclination angle θ1 of grooves 15*a*, 25*a* with respect to axes L of rotation of said first and second pulverizing rollers, an angle of inclination θ1 of the first pulverizing rollers 15 is smaller than an angle of inclination θ2 of the second pulverizing rollers 25. Accordingly, the fine paper powder can be produced without incurring a substantial environmental impact.

4 Claims, 3 Drawing Sheets

FOREIGN PATENT DOCUMENTS

| | | |
|---|---|---|
| JP | 10-211618 | 8/1998 |
| JP | 2001-181511 | 7/2001 |
| JP | 2003-128163 | 5/2003 |
| JP | 2004-042032 | 2/2004 |
| JP | 2007-045863 | 2/2007 |
| JP | 2007-111604 | 5/2007 |
| JP | 2009-028523 | 2/2009 |
| JP | 2009-029121 | 2/2009 |

* cited by examiner

METHOD FOR PRODUCING FINE PAPER POWDER AND RESIN COMPOSITION CONTAINING THE SAME

This application is a 371 of PCT/JP2009/005821, filed Nov. 2, 2009.

TECHNICAL FIELD

The present invention relates to a manufacturing method for producing fine paper powder, as well as to resin compositions containing the same, which contain fine paper powder therein obtained by the aforementioned manufacturing method.

BACKGROUND ART

Nowadays, large amounts of waste paper are discarded from offices, publication houses, paper manufacturing companies and the like. In general, at a stage during manufacturing of paper from wood, paper receives a high degree of processing in order to render cellulose fibers finely softened, such that paper is a functional material having a value-added structure. Therefore, waste paper is also a functional material having a value-added structure. Moreover, waste paper is a material that is effectively zero in terms of its environmental impact. Consequently, proposals have been made for using resin compositions containing paper, in which pulverized waste paper is mixed, for molding process materials.

For example, in Patent Document 1, a resin composition containing paper is disclosed in which a composite paper having a polyethylene resin on one or both surfaces thereof is shredded in a small piece state, a granular state, or a powdered state of about 1 mm to 5 mm square by a chopper or pulverizer type of shredder or the like, and such shredded paper components are mixed at 50% by weight or greater with a synthetic resin component of polyethylene or the like.

In Patent Document 2, a resin composition containing paper is disclosed in which collected waste paper, such as laminated paper or the like from liquid containers, is crushed to a particle diameter of 0.5 mm to 2.5 mm, and the crushed paper is mixed at not less than 51% by mass with a polyethylene or polypropylene resin.

In Patent Document 3, a resin composition containing paper for use in molding processes is disclosed, which contains in excess of 50% by weight and at or below 70% by weight of a low combustion component in powder form consisting mainly of paper powder and having a particle size of 50 μm or greater and 200 μm or less made by grinding waste paper or the like, and 30% or more by weight and less than 50% by weight of a high combustion component made up mainly from a thermoplastic resin.

BACKGROUND ART DOCUMENTS

Patent Document 1: Japanese Laid-Open Patent Publication No. 10-138241
Patent Document 2: Japanese Laid-Open Patent Publication No. 2007-045863
Patent Document 3: Japanese Laid-Open Patent Publication No. 2001-181511

SUMMARY OF THE INVENTION

Problems the Invention Aims to Solve

However, the resin compositions containing paper disclosed in Patent Documents 1 and 2 contain comparatively large-sized crushed paper such as shredded paper components of about 1 mm to 5 mm square, or crushed paper materials with a particle diameter of 0.5 mm to 2.5 mm. In the case that resin compositions of this type are used for manufacturing a complicatedly designed product with a fine structure by injection molding, the crushed paper, which does not exhibit fluidity even by heating thereof, disrupts the smooth flow of the resin composition, so that defects such as filling failures occur easily, and due to poor pattern transferability, high quality molded products with good yield cannot be obtained.

Further, in the case that a resin composition as disclosed in Patent Document 3 containing paper in powder form with a particle size of 50 μm or greater and 200 μm or less is used to produce a composite molded article having a fine structure by injection molding, similarly, the crushed paper in powder form, which does not exhibit fluidity even by heating thereof, disrupts the smooth flow of the resin composition, so that defects such as filling failures occur easily, and due to poor transferability, high quality molded products with good yield cannot be obtained.

The inventors of the present application have come to the understanding that if paper particles included in the resin composition are made into a powder with a particulate diameter of less than 50 μm, it becomes possible to carry out injection molding of high quality molded products with good yield.

Notwithstanding, it also was understood that when paper powder is pulverized using a crushing machine, such as a rod mill, ball mill, pan mill, pin mill or the like, there is a limitation of particle diameter size, on the order of 100 μm on average. Further, even if the crushing machine continues in operation, the paper fibers become intertwined in a flocculated condition, so that further progression of pulverization cannot be achieved.

Further, in the case that paper is pulverized by a vertical roller mill, a drug research mill, or a stone mill, upon achieving a particle diameter on the order of 50 μm or less, there is a problem of pulverizing efficiency decreases remarkably, and the benefit of using waste paper with a substantially zero environmental impact tends to be spoiled.

Taking into consideration the aforementioned points, the present invention has the object of providing a method for manufacturing fine paper powder, which enables one to produce fine paper powder with a particle diameter of less than 50 μm without incurring a substantial environmental impact, as well as a resin composition for molding process use, which contains fine paper powder therein obtained according to the aforementioned manufacturing method.

Means for Solving the Problem

The method for producing fine paper powder according to the present invention comprises a first fine pulverizing step of pulverizing coarsely ground paper powder using a first vertical roller mill equipped with a plurality of first pulverizing rollers, each having grooves formed on an outer circumferential surface thereof, in order to obtain a fine paper powder having an average particle diameter of 50 μm or greater and less than 150 μm, and a second fine pulverizing step of pulverizing the fine paper powder obtained in the first fine pulverizing step using a second vertical roller mill equipped with a plurality of second pulverizing rollers, each having grooves formed on an outer circumferential surface thereof, in order to obtain a fine paper powder having an average particle diameter of 25 μm or greater and less than 50 μm, wherein an angle of inclination of the grooves of the first pulverizing rollers with respect to axes of rotation of the first pulverizing rollers is smaller than an angle of inclination of the grooves of the second pulverizing rollers with respect to axes of rotation of the second pulverizing rollers.

According to the method for producing fine paper powder of the present invention, in the first fine pulverizing step, coarsely ground paper powder is pulverized using the first vertical roller mill until reaching an average particle diameter of 50 µm or greater and less than 150 µm. The angle of inclination of the grooves of the first pulverizing rollers with respect to axes of rotation of the first pulverizing rollers is small. As a result thereof, because the distance (time) at which paper particles are continuously bitten into gaps between the outer circumferential surface of the first pulverizing rollers and the inner circumferential wall surface of the pulverization chamber is short, and opening of the intertwined structure of the paper fibers progresses, pulverization efficiency up to a particle diameter of 50 µm or greater and less than 150 µm is superior while environmental impact is reduced. Further, by means of the first fine pulverizing step, the paper powder more preferably is pulverized to a particle diameter of 50 µm or greater and less than 100 µm.

Further, in the second fine pulverizing step, the fine paper powder having an average particle diameter of 50 µm or greater and less than 150 µm obtained in the first fine pulverizing step is further pulverized using the second vertical roller mill until reaching an average particle diameter of 25 µm or greater and less than 50 µm. The angle of inclination of the grooves of the second pulverizing rollers with respect to axes of rotation of the second pulverizing rollers is large. As a result thereof, because the distance (time) at which paper particles are continuously bitten into gaps between the outer circumferential surface of the second pulverizing rollers and the inner circumferential wall surface of the pulverization chamber is long, and mashing of the fine paper powder progresses and the opened paper fibers are made even finer, pulverization efficiency up to a particle diameter of 25 µm or greater and less than 50 µm is superior, while environmental impact is reduced.

For example, in the method for producing fine paper powder of the present invention, preferably, the angle of inclination of the grooves of the first pulverizing rollers with respect to axes of rotation of the first pulverizing rollers is greater than or equal to 5° and less than or equal to 45°, whereas the angle of inclination of the grooves of the second pulverizing rollers with respect to axes of rotation of the second pulverizing rollers is greater than or equal to 45° and less than or equal to 85°.

Further, in the method for producing fine paper powder of the present invention, preferably, bottom portions of the grooves of the first pulverizing rollers and the second pulverizing rollers are of a circular arc shape when viewed from the side.

In this case, although there is a tendency for fine paper powder to become collected in and clog the grooves of the first pulverizing rollers and the second pulverizing rollers, thereby worsening pulverizing efficiency, by making the bottom portions of the grooves circular arc shaped when viewed from the side, clogging of the grooves can effectively be prevented.

The resin composition containing fine paper powder of the present invention is characterized by a mixture of fine paper powder having an average particle diameter of 25 µm or greater and less than 50 µm obtained according to the aforementioned method for producing fine paper powder, mixed with at least one resin selected from the group consisting of polyethylene, polypropylene, an olefin-based elastomer, polystyrene, an acrylonitrile-styrene copolymer synthetic resin, an acrylonitrile-butadiene-styrene copolymer synthetic resin, nylon, polybutylene terephthalate, and polyethylene terephthalate, wherein a weight ratio of the fine paper powder lies within a range of from 50% to 60% by weight.

In accordance with the resin composition containing fine paper powder of the present invention, because fine paper powder having an average particle diameter of 25 µm or greater and less than 50 µm is contained therein, when a molding process is performed using the resin composition containing fine paper powder, transferability is excellent and therefore high quality molded products with good yield can be obtained.

BEST MODE FOR CARRYING OUT THE INVENTION

An embodiment of the method for producing fine paper powder according to the present invention shall be described below with reference to the drawings.

The present method for producing fine paper powder includes a coarse grinding step and fine pulverizing steps, for pulverizing raw material waste paper until a fine paper powder having an average particle diameter of 25 µm or greater and less than 50 µm is obtained. Among such waste paper products may be included various types of waste paper from newspapers and magazines, waste paper from printed matter, waste wrapping paper, discarded cardboard boxes, office paper, etc., broken and damaged sheets that occur upon manufacturing of virgin paper, cutting wastage from magazines and the like, grinding powders, shredder scraps, etc. Such waste papers typically are discarded in great amounts from offices, publishing houses, manufacturing companies and the like, and are valued as having a substantially zero negative effect on the environment. The average particle diameter of paper powder was measured by a laser diffraction-type particle size distribution measuring instrument (Mastersizer S Model, made by Marvern Instruments Ltd.).

By means of the coarse grinding step, using a coarse grinding machine such as a roll crusher, a hammer crusher, a cutter mill or the like, waste paper is ground into paper cuttings of a few millimeters to several tens centimeters square, and more preferably 2 to 4 millimeters square. In the case that the waste paper comes from damaged or discarded paper in rolls or sheet form, a cutting machine may be used as the coarse pulverizer. Further, in the case that the waste paper is already below several mm square, such as grindings from ground up books, shredder scraps or the like, the coarse grinding step may not be necessary.

Figure 1:
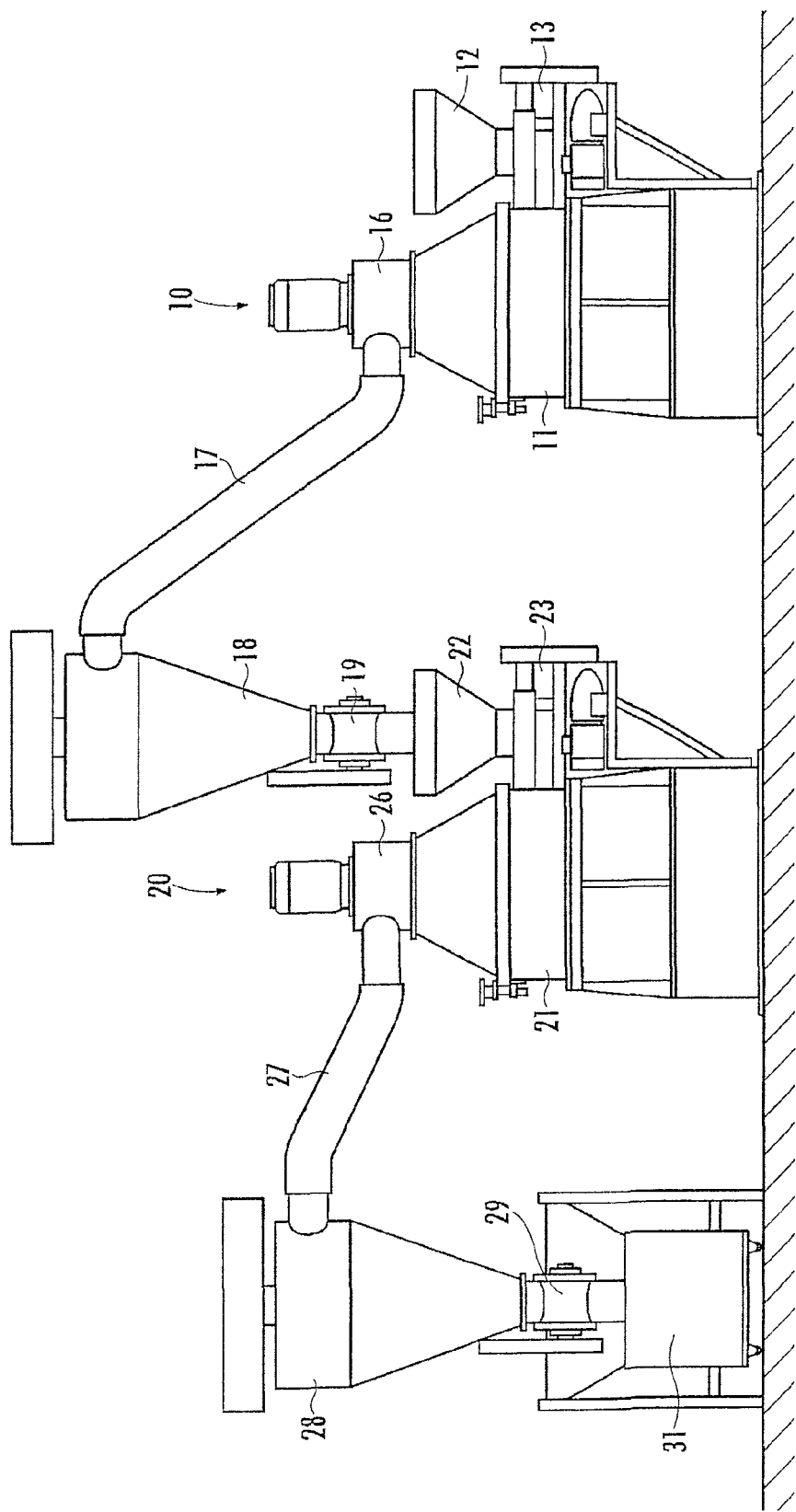
FIG. 1 is an outline view showing a fine pulverizing apparatus according to an embodiment of the present invention.

The fine pulverizing step is a step by which the coarsely ground paper obtained in the coarse grinding step is finely pulverized to obtain fine paper powder having an average particle diameter of 25 µm or greater and less than 50 µm. Herein, as shown in FIG. 1, the fine pulverizing step is carried out using a fine pulverizing apparatus in which two vertical roller mills 10, 20 are connected in series. Such a vertical roller mill is representative of roller mills, and is a roller type grinder, which may also simply be referred to as a "roller mill" in general.

In the first fine pulverizing step, the coarsely ground paper obtained in the coarse grinding step is finely pulverized using the first vertical roller mill 10 in order to obtain fine paper powder having an average particle diameter of 50 μm or greater and less than 150 μm. The coarsely ground paper obtained in the coarse grinding step is supplied to the interior of a pulverization chamber 11 of the first vertical roller mill 10. More specifically, via a supply hopper (raw material supply port) 12 and a supply screw 13, paper particles are supplied to the interior of the pulverization chamber (housing) 11. Although not shown, the paper particles are supplied at a constant rate into the hopper 12 using a rotary valve, a screw feeder, or the like.

Figure 2:
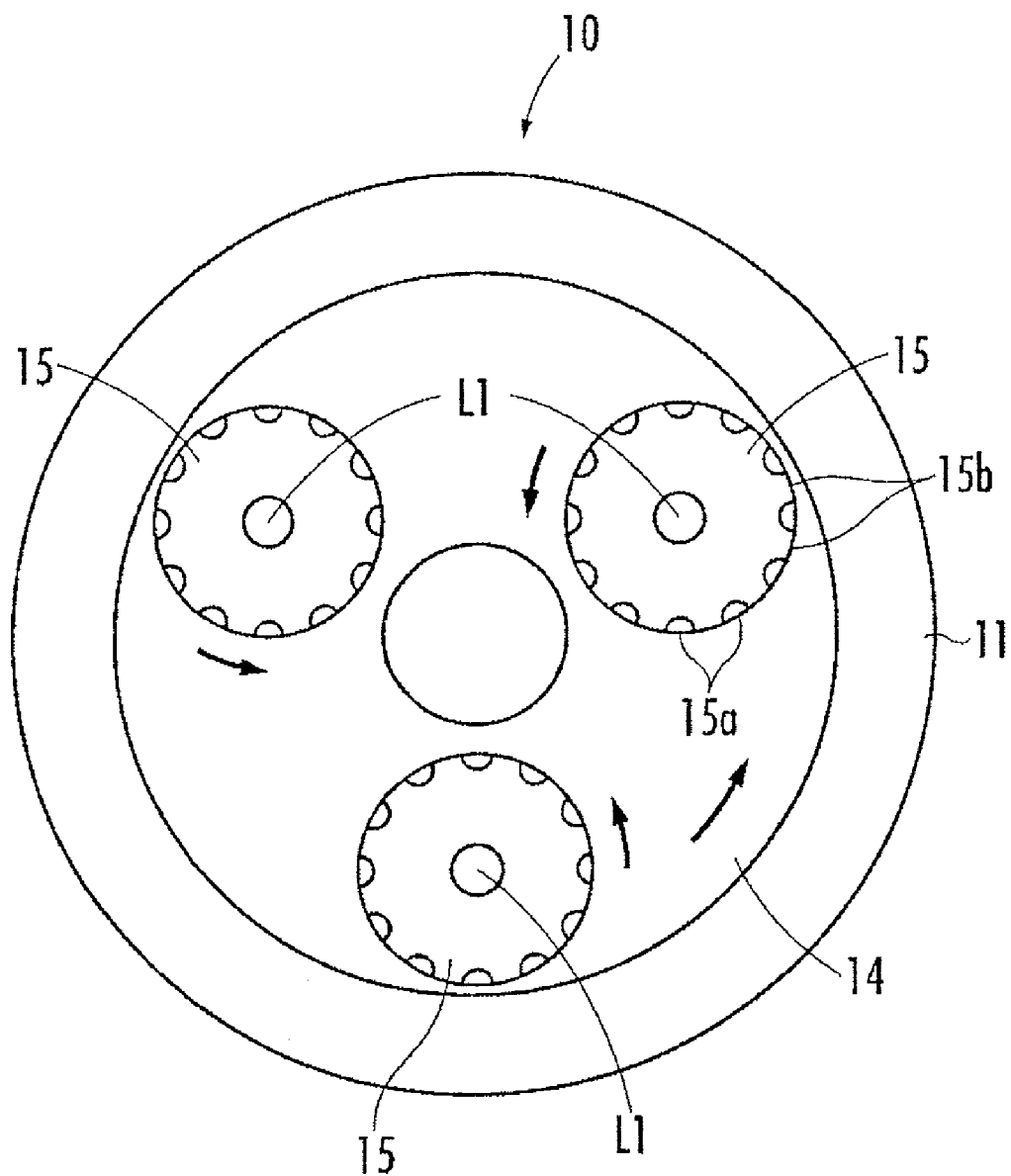
FIG. 2 is an outline view showing the interior of a first vertical roller mill.

As shown in FIG. 2, the first vertical roller mill 10 comprises a rotary table 14 disposed inside the cylindrically shaped pulverization chamber 11 and which is driven rotatably by a motor (not shown), and a plurality of vertically oriented first pulverizing rollers 15, which are arranged and spaced at given intervals in the direction of rotation of the rotary table 14. The first pulverizing rollers 15 are free rollers on which loads are imposed toward the rotary table by means of hydraulic pressure, springs or the like, and which rotate in following relation to rotation of the rotary table 14. Accompanying rotation of the rotary table 14, the first pulverizing rollers 15 press against the inner circumferential wall surface of the pulverization chamber 11, so that paper particles are bitten between the lands 15b of the first pulverizing rollers 15 and the inner circumferential wall surface of the pulverization chamber 11 in order to pulverize the paper particles.

Figure 3:
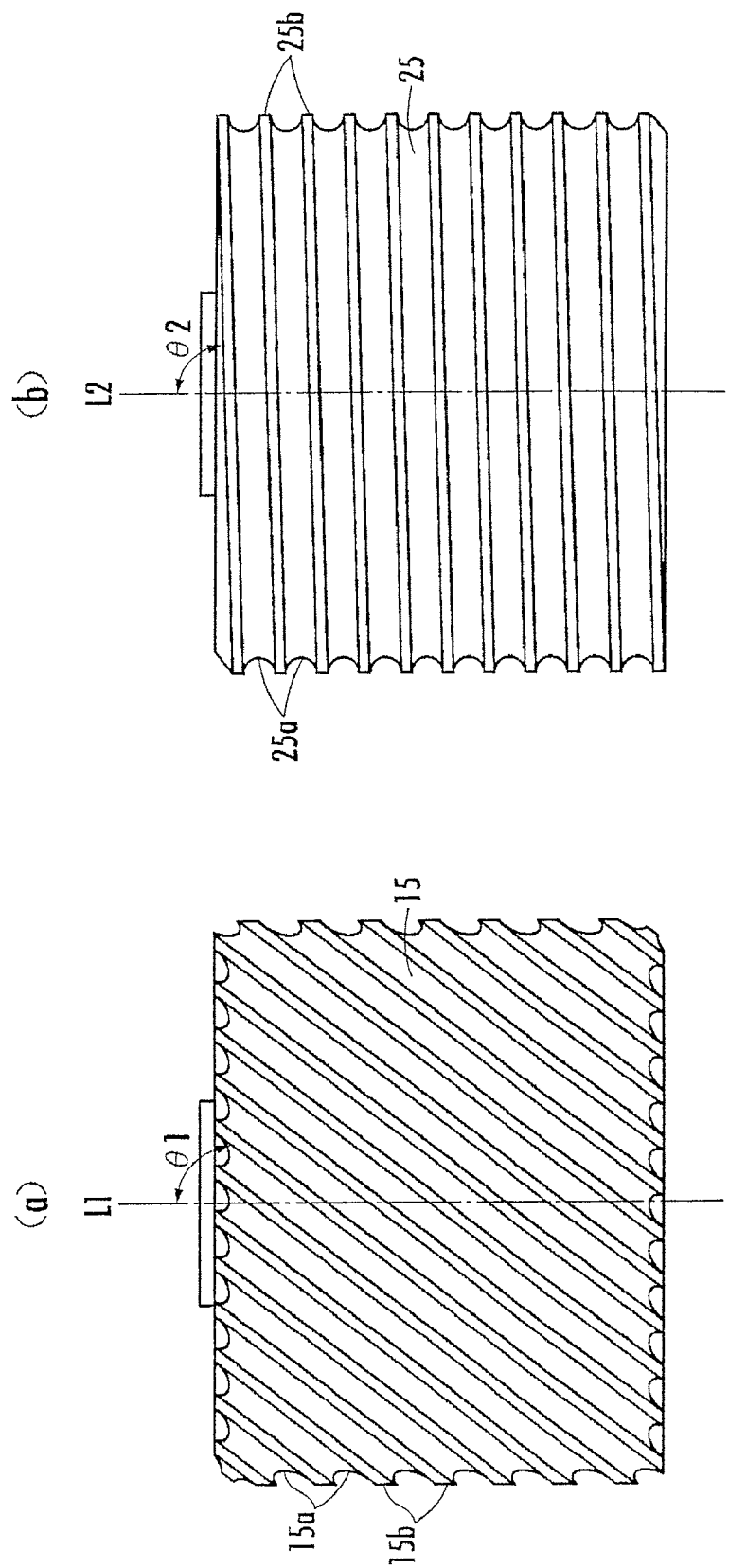
FIG. 3 illustrates respective side surface views, showing (a) a first pulverizing roller and (b) a second pulverizing roller.

As shown in FIG. 3(a), helical grooves 15a are recessed into the outer circumferential surface of each of the first pulverizing rollers 15. The grooves 15a are inclined with respect to an axis of rotation L1 of the first pulverizing roller 15, wherein the angle of inclination θ1 preferably is greater than or equal to 5° and less than or equal to 45°, and more preferably is greater than or equal to 5° and less than or equal to 30°. In the present embodiment, the angle of inclination θ1 is 10°. In this manner, the angle of inclination θ1 of the grooves 15a is small, with the grooves 15a being oriented roughly in a vertical direction.

Incidentally, in normal grinding rollers such as those used when crushing foods or grains, the cross section of the grooves of such rollers are trapezoidal as viewed from the side and have corners at the bottom thereof. However, paper powder in particular easily adheres to such angled portions, and jamming or clogging of the grooves occurs rapidly. When clogging of the grooves occurs, grinding efficiency is reduced. Consequently, the bottoms of the grooves 15a are formed to be arcuate as viewed from the side, and it is difficult for clogging of the grooves 15a to occur. In the present embodiment, the cross sectional form of the grooves 15a as viewed from the side has a tapered shape substantially in the form of a U-shape.

The coarse paper powder supplied to the interior of the pulverization chamber 11 is transferred to the outer circumference of the rotary table 14 by centrifugal force of the rotary table 14, and the paper powder is bitten between the lands 15b of the first pulverizing rollers 15 and the inner circumferential wall surface of the pulverization chamber 11 and becomes pulverized. Because the angle of inclination θ1 of the grooves 15a is small with respect to the axis of rotation of the first pulverizing rollers 15, the distance (time) at which the paper powder is retained in the gaps and bitten between the outer circumferential surface of the first pulverizing rollers 15 and the inner circumferential wall surface of the pulverization chamber 11 is short, and mashing of the fine paper powder progresses and the opened paper fibers are made even finer. Owing thereto, excellent pulverization efficiency up to a particle diameter of 50 μm or greater and less than 150 μm is enabled, while environmental impact is reduced.

By introducing external air into the interior of the pulverization chamber 11 and upward blowing of the air by vanes, the fine paper powder having become finely pulverized is blown into the upper section 16 of the pulverization chamber 11. Additionally, as shown in FIG. 1, via a classifier (rotary vane separator) (not shown) disposed in the upper section 16 of the pulverization chamber 11, fine paper powder having an average particle diameter of 50 μm or greater and less than 150 μm is discharged from a supply pipe (supply duct) 17.

In this manner, the coarsely pulverized paper powder having an average particle diameter of 2 mm or greater and less than 4 mm is finely pulverized by the first vertical roller mill 10 until obtaining an average particle diameter of 50 μm or greater and less than 150 μm. Paper powder having a particle diameter of 50 μm or greater is impaled by the rotary vane and falls back down naturally, where the paper powder is repulverized.

In the second fine pulverizing step, the finely ground paper obtained in the first fine pulverizing step is finely pulverized using the second vertical roller mill 20 in order to obtain fine paper powder having an average particle diameter of 25 μm or greater and less than 50 μm. The finely ground paper having an average particle diameter of 25 μm or greater and less than 50 μm obtained by the first vertical roller mill 10 is supplied to the interior of a pulverization chamber 21 of the second vertical roller mill 20, via the supply pipe 17. Specifically, via the supply pipe 17, a dust chamber 18, a rotary valve 19, a screw feeder (not shown), a supply hopper 22 and a supply screw 23, coarse finely ground paper particles are supplied to the interior of the pulverization chamber 21.

The configuration of the second vertical roller mill 20 is similar to that of the first vertical roller mill 10, and comprises a rotary table 24 (not shown) disposed inside the cylindrically shaped pulverization chamber 21 and which is driven rotatably by a motor (not shown), and a plurality of vertically oriented second pulverizing rollers 25, which are arranged and spaced at given intervals in the direction of rotation of the rotary table 24. However, as shown in FIG. 3(b), the angle of inclination θ2 with respect to an axis of rotation L2 of the second pulverizing roller 25 is larger than the angle of inclination θ1 with respect to an axis of rotation L1 of the first pulverizing roller 15.

The angle of inclination θ2 preferably is greater than or equal to 45° and less than or equal to 85°, and more preferably is greater than or equal to 50° and less than or equal to 75°. In the present embodiment, the angle of inclination θ2 is 60°. As with the grooves 15a, the bottoms of the grooves 25a are formed to be arcuate as viewed from the side. In the present embodiment, the cross sectional form of the grooves 25a as viewed from the side has a tapered shape substantially in the form of a U-shape.

The fine paper powder supplied to the interior of the pulverization chamber 21 is transferred to the outer circumference of the rotary table 24 by centrifugal force of the rotary table 24, and the paper powder is bitten between the lands 25b of the second pulverizing rollers 25 and the inner circumferential wall surface of the pulverization chamber 21 and becomes pulverized. Because the angle of inclination θ2 of the grooves 25a is large with respect to the axis of rotation of the second pulverizing rollers 25, the distance (time) at which the paper powder is retained in the gaps and bitten between the outer circumferential surface of the second pulverizing rollers 25 and the inner circumferential wall surface of the pulverization chamber 21 is longer, and mashing of the fine paper powder and the opened paper fibers are made even finer. Owing thereto, excellent pulverization efficiency up to a particle diameter of 25 µm or greater and less than 50 µm is enabled, while environmental impact is reduced.

By introducing external air into the interior of the pulverization chamber 21 and upward blowing of the air by vanes, the fine paper powder having become finely pulverized is blown into the upper section 26 of the pulverization chamber 21. Additionally, as shown in FIG. 1, via a classifier (rotary vane separator) (not shown) disposed in the upper section 26 of the pulverization chamber 21, fine paper powder having an average particle diameter of 25 µm or greater and less than 50 µm is discharged from a supply pipe (supply duct) 27.

In this manner, the coarsely pulverized fine paper powder having an average particle diameter of 50 µl or greater and less than 150 µm is finely pulverized by the second vertical roller mill 20 until obtaining an average particle diameter of 25 µm or greater and less than 50 µl. Paper powder having a particle diameter of 50 µm or greater is impaled by the rotary vane and falls back down naturally, where the paper powder is repulverized. Pulverizing to a degree of less than an average particle diameter of 25 µm is not desirable due to the fact that the impact on the environment relating to fine pulverization becomes larger, and the benefit of using waste paper with a substantially zero environmental impact tends to be diminished.

The minutely pulverized fine paper powder having an average particle diameter of 25 µm or greater and less than 50 µm passes via a dust collector 28 and a rotary valve 29, and is accumulated in a collection box 31.

In place of the rotary tables 14, 24, which rotate while supporting lower portions of the pulverizing rollers 15, 25 thereon, rotary hanging members may be used, which rotate while upper portions of the pulverizing rollers 15, are supported thereby (i.e., with the pulverizing rollers hanging therefrom in a suspended state). Further, although recessed grooves may also be formed on the inner circumferential walls of the pulverization chambers 11, 21, because there is a concern that the paper powder could become collected in and clog such recessed grooves, it is more preferred that the inner circumferential walls of the pulverization chambers are kept smooth.

In the foregoing manner, by carrying out the fine pulverization steps, fine paper powder having an average particle diameter of 25 µm or greater and less than 50 µm can be obtained with excellent pulverization efficiency, and the impact on the environment is small.

Moreover, the average particle diameter of the generated fine paper powder, processing capacity, and the like are determined corresponding to operating conditions in relation to the vertical roller mills 10, 20 and the type of waste paper serving as the raw material, for example, conditions such as operating hours, rotational speed of the rotary tables, and the amount and percentage of minutely pulverized fine paper powder introduced into the vertical roller mill 20, etc. Thus, the average particle size required for the fine paper powder, and operating conditions suitable for a given processing capacity, etc., may be determined appropriately through experimentation.

Further, the method for producing fine paper powder of the present invention is not limited to the above-described embodiment. For example, in the vertical roller mills 10, 20, a case has been illustrated in which supply ports for supplying paper powder from the supply hoppers 12, 22 into the pulverization chambers 11, 21 are disposed to one side of the rotary tables. However, any or all of the supply ports may be disposed above the rotary tables.

Below, an embodiment of a resin composition containing fine paper powder according to the present invention shall be explained.

In the resin composition containing fine paper powder according to the present invention, fine paper powder having an average particle diameter of 25 µm or greater and less than 50 µm, which is obtained by the method for producing fine paper powder of the above-noted embodiment, is mixed in a resin such that the weight ratio of the fine paper powder lies within a range of from 50% to 60% by weight. Such a produced resin can be used suitably as a material for molding processes. The term weight ratio implies a ratio with respect to the total weight of fine paper powder contained within the resin composition.

In the case that the contained amount of fine paper powder is less than 50% by weight, functional expressions are suppressed, such as the ability to absorb warping during molding based on a flexible structure having such paper particles therein, and environmental performance becomes degraded as well. Conversely, in the case that the contained amount of fine paper powder exceeds 60% by weight, the paper particles, which do not exhibit melt-fluidity by heating, hinder flowability of the resin, the likelihood for molding defects to occur becomes higher, energy consumption due to a rise in the molding pressure and the like increases, and environmental performance is degraded.

The resin is a resin composed of one or two or more selected from among any of polyethylene, polypropylene, an olefin-based elastomer, polystyrene, an AS resin (acrylonitrile-styrene copolymer synthetic resin), an ABS resin (acrylonitrile-butadiene-styrene copolymer synthetic resin), nylon, PBT (polybutylene terephthalate) and PET (polyethylene terephthalate). The weight ratio of the resin is 40% or greater by weight and less than 50% by weight.

Preferably, a surface active agent to improve mixing of the fine paper powder with the resin is included, whereby a surface modification treatment is implemented. The surface active agent preferably is composed of one or two or more types selected from among any of various silane coupling agents, higher fatty acids such as stearic acid, various highly fatty acid esters, higher fatty acid amide, ethylene oligomers, polyethylene wax, maleic modified ester wax and maleic acid modified wax, and low molecular weight crystalline polyolefin. Silane coupling agents increase interaction between inorganic particles and the resin, thereby improving mixing with the resin by absorption of inorganic pigments contained in the paper. The other surface active agents also improve mixing by increasing interaction between the paper powder and the resin.

The surface active agent preferably is included within a range of 0.1% by weight or greater and 5% by weight or less. If the additive amount of the surface active agent is less than 0.1% by weight, sufficient improvement in the mixing effect cannot be obtained, whereas if the additive amount thereof exceeds 5% by weight, the possibility of adverse effects, such as exudation phenomena imparted to the surface of molded products, increases.

Further, preferably, a resin modifying agent also is contained therein. The resin modifying agent is composed of one or two or more selected from among any of maleic acid modified polyolefin, an olefin-maleic anhydride copolymer, maleic acid modified wax, and maleate modified wax. Such resin modifying agents mix well with resins, in particular olefin resins, to introduce polar groups, thereby enhancing interaction with the paper powder and improving kneadability.

The resin modifying agent preferably is included within a range of 0.5% by weight or greater and 10% by weight or less. If the additive amount of the resin modifying agent is less than 0.5% by weight, the modifying effect thereof is poor. On the other hand, if the additive amount thereof exceeds 10% by weight, there is a possibility that the characteristics of strength and rigidity possessed inherently by the resin could be lost.

A composition containing fine paper powder can be manufactured using an extruder. From an insertion port (hopper), which is disposed on a rear end portion of the extruder, fine paper powder and a resin are injected together with a surface active agent and/or a resin modifying agent as needed. The interior of the extruder is heated, and the resin and fine paper powder are mixed and kneaded by means of a rotating screw to produce a molten mixture in which fine paper powder is dispersed into the resin substantially uniformly. The molten mixture is extruded from a die (mold) that is disposed on a front end portion of the extruder, and a resin composition containing fine paper powder with a predetermined cross sectional shape is produced. Corresponding to the shape of the lip of the die, the resin composition containing fine paper powder may be formed in the shape of pellets, plates, sheets or the like. A resin composition containing fine paper powder in the form of pellets can be used suitably as a material for various molding processes, such as injection molding, blow molding, inflation molding, vacuum molding, melt-compression molding, press molding and the like.

In this manner, because a fine paper powder having an average particle diameter of 25 µm or greater and less than 50 µm is included therein, when a molding process is performed using the resin composition containing fine paper powder, since transferability is superior, high quality molded products with good yield can be obtained. Further, because waste paper is used as a raw material, resources are used effectively, and since there is little environmental impact due to the waste paper pulverizing operations, environmental performance is excellent.

Embodiment 1

Cut waste paper from paperboard was pulverized to 4 mm square by a cutter mill. Next, the first fine pulverizing step and the second fine pulverizing step were carried out successively in a linked fashion, using the first vertical roller mill 10 and the second roller mill 20 respectively, to thereby obtain a fine paper powder having an average particle diameter of 45 µm. The amount of carbon dioxide emission produced by the system boundary from collection of raw materials to production of the fine paper powder, as calculated by Life Cycle Assessment execution support software (JEMAI-LCA Pro Ver. 2.12, produced by the Japan Environmental Management Association for Industry), was 0.138 kg per 1 kg of paper powder.

50 parts per weight of the fine paper powder from a first insertion port and 50 parts per weight of a polypropylene homopolymer (produced by Japan Polychem Corp., Trade Name Novatec PP MA3AQ) from a second insertion port were charged respectively into a biaxial extruder and made into pellets. Using such materials, no abnormal strand breaking occurred during manufacturing of the pellets, and pellets could be stably manufactured. Using such pellets, a bowl-shaped molded product was obtained by performing injection molding. The molded article had a good appearance without spots due to poor dispersion of the fine paper powder therein. Also, a molded product in the shape of a box was injection molded, which exhibited only slight molding warpage therein and was favorable overall.

Comparative Example 1

Cut waste paper from paperboard was pulverized to 4 mm square by a cutter mill. Next, the first fine pulverizing step was carried out using the first vertical roller mill 10, and the second fine pulverizing step also was carried out using the first vertical roller mill 10, the processes being carried out in succession in a linked fashion, to thereby obtain a fine paper powder having an average particle diameter of 45 µm. However, the paper powder produced by the second fine pulverizing step tended to flocculate easily. The amount of carbon dioxide emission produced on manufacturing the fine paper powder, calculated in the same manner as Embodiment 1, was 0.160 kg per 1 kg of paper powder, and thus the benefit of using waste paper as a resource with a substantially zero environmental impact was diminished.

Comparative Example 2

Cut waste paper from paperboard was pulverized to 4 mm square by a cutter mill. Next, the first fine pulverizing step was carried out using the second vertical roller mill 20, and the second fine pulverizing step also was carried out using the second vertical roller mill 20, the processes being carried out in succession in a linked fashion, to thereby obtain a fine paper powder having an average particle diameter of 50 µl. The amount of carbon dioxide emission produced on manufacturing the fine paper powder, calculated in the same manner as Embodiment 1, was 0.168 kg per 1 kg of paper powder, and thus the benefit of using waste paper as a resource with a substantially zero environmental impact was diminished.

The invention claimed is:
1. A method for producing fine paper powder, comprising:
a first fine pulverizing step of pulverizing coarsely ground paper powder using a first vertical roller mill equipped with a plurality of first pulverizing rollers, each having helical grooves formed on an outer circumferential surface thereof, in order to obtain a fine paper powder having an average particle diameter of 50 µm or greater and less than 150 µm; and
a second fine pulverizing step of pulverizing said fine paper powder obtained in said first fine pulverizing step using a second vertical roller mill equipped with a plurality of second pulverizing rollers, each having helical grooves formed on an outer circumferential surface thereof, in order to obtain a fine paper powder having an average particle diameter of 25 µm or greater and less than 50 µm,
wherein an angle of inclination of the grooves of said first pulverizing rollers with respect to axes of rotation of said first pulverizing rollers is smaller than an angle of inclination of the grooves of said second pulverizing rollers with respect to axes of rotation of said second pulverizing rollers.
2. The method for producing fine paper powder according to claim 1, wherein the angle of inclination of the grooves of said first pulverizing rollers with respect to axes of rotation of said first pulverizing rollers is greater than or equal to 5° and less than or equal to 45°, and the angle of inclination of the grooves of said second pulverizing rollers with respect to axes of rotation of said second pulverizing rollers is greater than or equal to 45° and less than or equal to 85°.

3. The method for producing fine paper powder according to claim 1, wherein the cross sectional form of the grooves of said first pulverizing rollers and said second pulverizing rollers is substantially in the form of a U-shape having a bottom formed in a circular arc shape.

4. The method for producing fine paper powder according to claim 2, wherein the cross sectional form of the grooves of said first pulverizing rollers and said second pulverizing rollers is substantially in the form of a U-shape having a bottom formed in a circular arc shape.

* * * * *